Jan. 26, 1943.  J. W. SEIGH  2,309,259
WICKET FOR DRYING OVENS
Filed Oct. 27, 1941  2 Sheets-Sheet 2
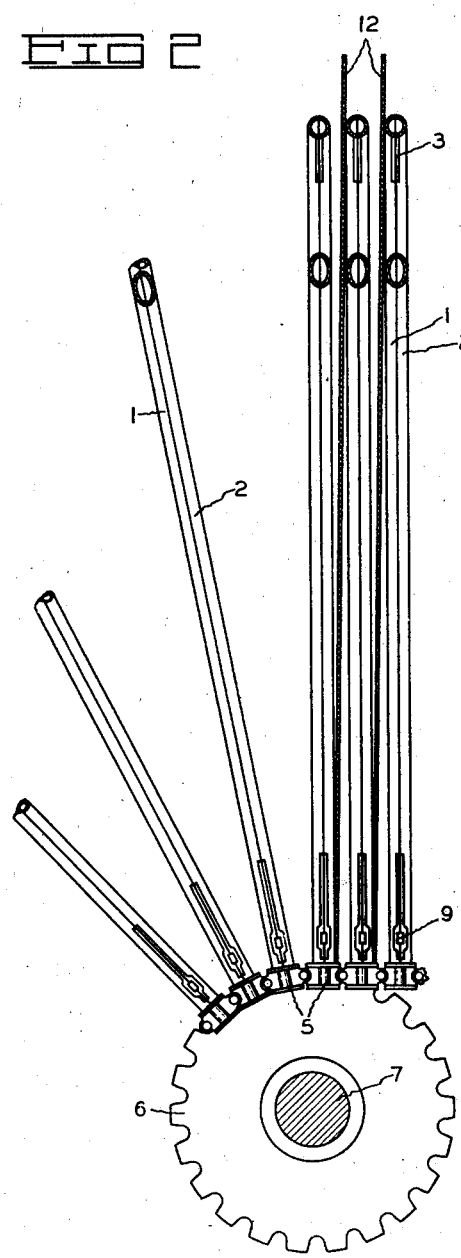
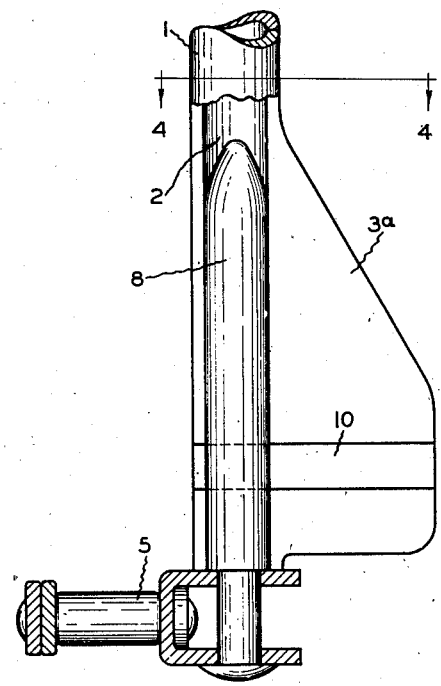
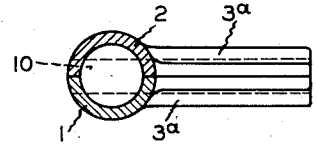
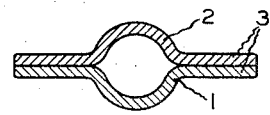
INVENTOR
Joseph W. Seigh
BY Martin J. Manion
ATTORNEY Patented Jan. 26, 1943

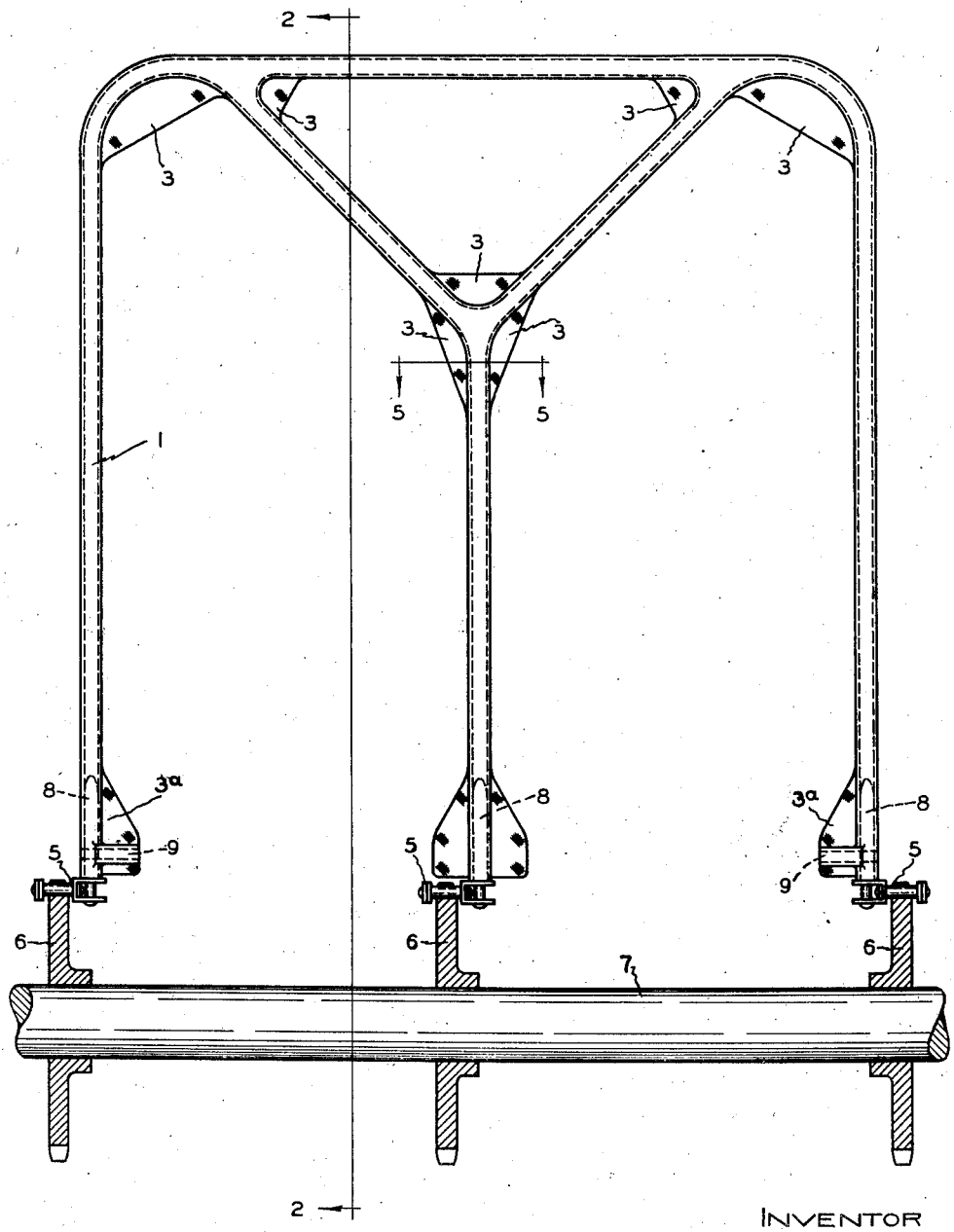

2,309,259

UNITED STATES PATENT OFFICE 2,309,259

WICKET FOR DRYING OVENS

Joseph W. Seigh, Teaneck, N. J.

Application October 27, 1941, Serial No. 416,646

4 Claims. (Cl. 34—150)

This invention relates to carrier trays or wickets for conveying lithographed or other coated sheets through a drying or baking oven.

Lithographed or other coated metal sheets are separately transported through the drying or baking oven between carrier trays or wickets fastened to continuously traveling endless conveyor chains. Carrier trays commonly used today are fabricated from solid bars or rods which retain the comparatively high temperature of the drying or baking for a long period of time so that frequently the freshly coated metal sheet is burned and objectionably marked by the carrier trays when the sheet is placed between two spaced, previously heated trays preliminary to being passed through the oven.

Moreover, the solid wickets are substantially permanently attached to the endless conveyor chains so that repair and replacement is effected with difficulty.

It is, therefore, an object of the present invention to provide a carrier tray of the character referred to which comprises two complemental stampings preferably formed from light gauge sheet metal and placed together to form a wicket capable of rapidly dissipating the inherent heat after making its exit from the oven.

Another object of the invention is to provide a wicket which will come up to heat uniformly with the work being treated in the oven.

With these and other objects in view, the invention resides in the features of construction, arrangement of parts, and combination of elements, which will hereinafter be described, reference being had to the accompanying drawings, in which—

Figure 1 is a front elevational view of a wicket showing it attached to the endless conveyor chains;

Figure 2 is a transverse sectional view, substantially on line 2—2 of Fig. 1, illustrating a plurality of the wickets attached to the conveyor chain;

Figure 3 is an enlarged vertical sectional view of one of the lower ends of a wicket illustrating its means of attachment to the chain;

Figure 4 is a sectional view taken on line 4—4 of Fig. 3; and—

Figure 5 is an enlarged sectional view taken on line 5—5 of Fig. 1.

The present invention contemplates fabricating the wickets from two complemental stampings 1 and 2, preferably made from light gauge metal. Two such stampings, the elements of which are substantially semi-circular in cross section, are placed in face-to-face relation and preferably permanently attached together by spot welding strengthening webs or wings 3 formed integral with each stamping 1 and 2, thereby forming a hollow, tubular wicket whose abutting edges are seamless and open to permit uniform heating when passing through the oven and permitting rapid dissipation of heat after being discharged from the oven.

The links of the endless conveyor chains 5, which are driven by sprockets 6 borne by a shaft 7, have spaced, upstanding, tapered studs 8 permanently attached thereto and the wickets are removably attached to the chains by placing the tubular lower ends of the wicket about the studs 8 and locking the same thereon by transverse keys 9 which are adapted to be accommodated by transversely disposed keyways 10 formed in the studs 8 and the webs 3ª at the two opposite ends of the wicket.

All that is required to replace a wicket is to remove the retaining keys 9, remove the wicket from its supporting studs 8 and replace it with a new wicket after which the latter is retained in place by the keys 9, this being possible because the wickets are accurately and precisely made to size and shape by forming dies.

Because the wickets are hollow; have open sides, and are fabricated from light gauge sheet metal, the inherent heat accumulated therein during passage through the oven will be substantially dissipated during the interval of time lapsing between its discharge from the exit end of the oven with a treated sheet and its entrance into the opposite end of the oven with a freshly coated sheet 12 to be treated. Consequently, the last mentioned sheet will not become marked by a wicket burn. Moreover, because of its construction, the light gauge wicket will come up to heat uniformly with the sheet it is transporting through the oven.

One form of wicket has herein been shown and described, but it will be understood that other various shapes and styles are contemplated. Likewise, the wicket may be fabricated from material other than metal, such as Bakelite, etc.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

What is claimed is:

1. A wicket for use with oven conveyors including a substantially inverted U-shaped body composed of a pair of complementary members having confronting concavities and contacting side edges to provide a passage for heat therethrough, means to connect the members together at spaced points only so as to leave the remaining portions of the contacting edges of said members free of connection, and means to mount the wicket on a conveyor.

2. A wicket for use with oven conveyors, in accordance with claim 1, wherein the connecting means between the members consist of complementary spaced abutting wings and means connecting said wings together.

3. The combination with an oven conveyor, in accordance with claim 1, wherein the mounting means consists of a pin and socket connection between the conveyor and wicket.

4. The combination with an oven conveyor in accordance with claim 1, wherein the mounting means consists of pins carried by the conveyor and which extend into the passages at the free ends of the wickets.

JOSEPH W. SEIGH.